No. 730,989. PATENTED JUNE 16, 1903.
D. B. DE WALTOFF.
DISPENSING APPARATUS.
APPLICATION FILED OCT. 30, 1902.
NO MODEL. 2 SHEETS—SHEET 1.
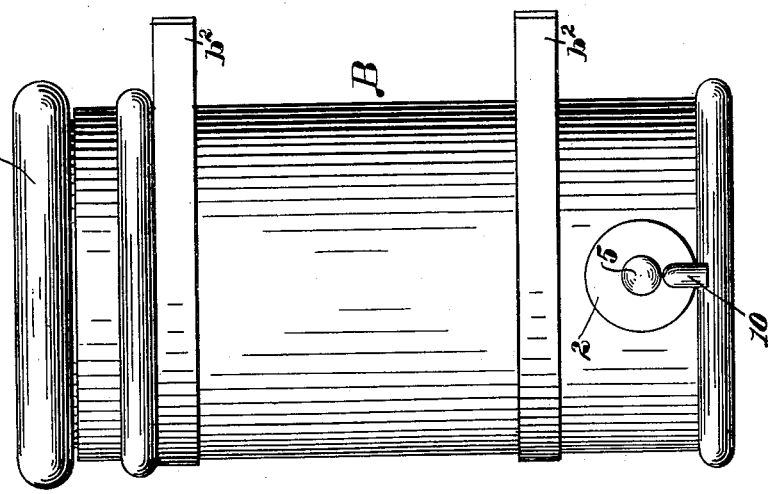
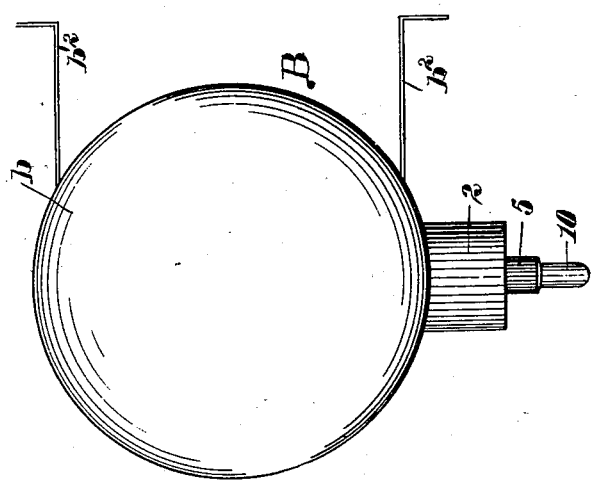
Witnesses:
Inventor:
D. B. de Waltoff,
By his Attorney, No. 730,989. PATENTED JUNE 16, 1903.
D. B. DE WALTOFF.
DISPENSING APPARATUS.
APPLICATION FILED OCT. 30, 1902.
NO MODEL. 2 SHEETS—SHEET 2.
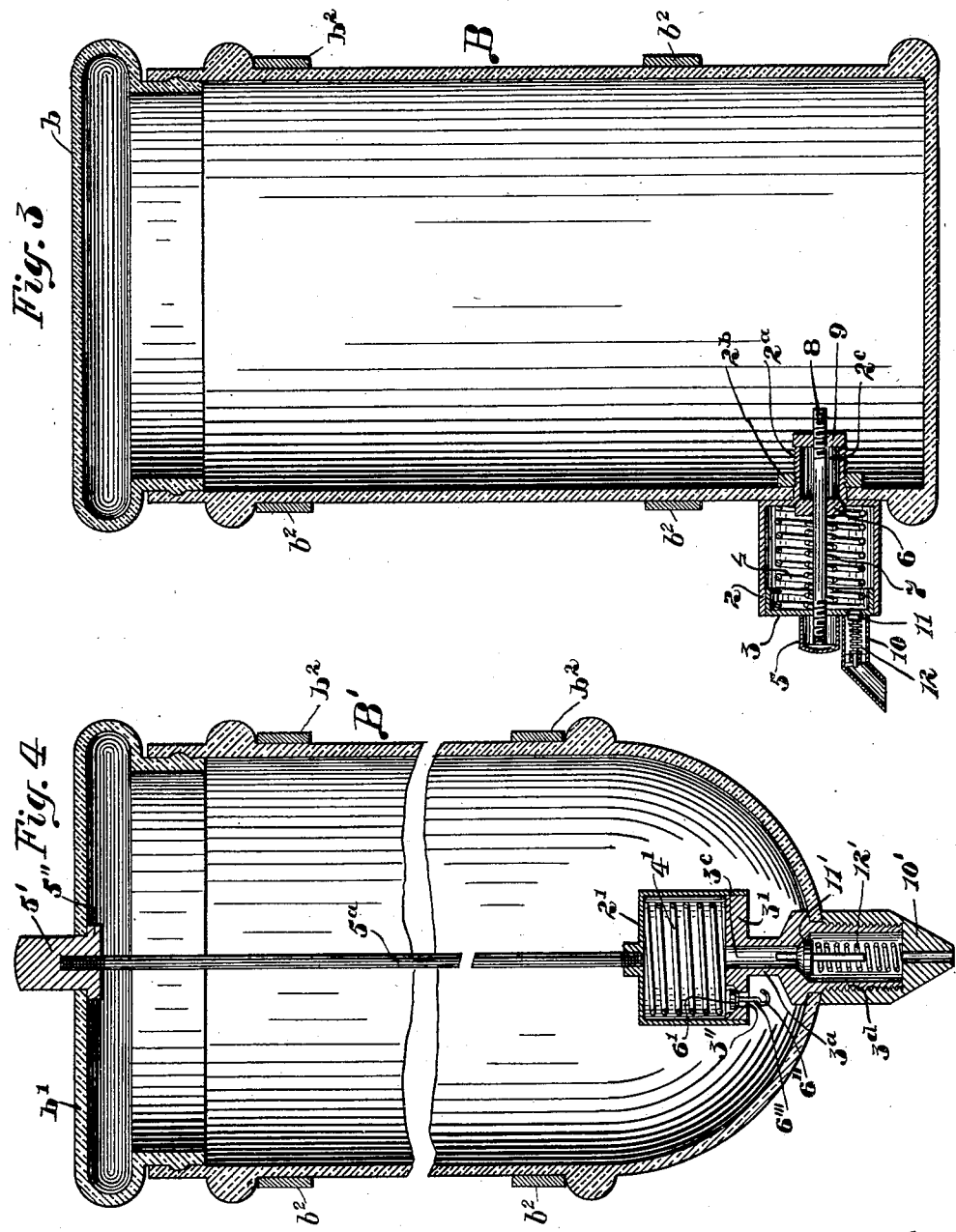
Witnesses:
C. A. Jarvis.
Inventor:
D. B. de Waltoff,
By his Attorney,
Pierson L. Wells.

No. 730,989. Patented June 16, 1903.

UNITED STATES PATENT OFFICE.

DAYVE BORIS DE WALTOFF, OF NEW YORK, N. Y.

DISPENSING APPARATUS.

SPECIFICATION forming part of Letters Patent No. 730,989, dated June 16, 1903.

Application filed October 30, 1902. Serial No. 129,453. (No model.)

*To all whom it may concern:*

Be it known that I, DAYVE BORIS DE WALTOFF, of the borough of Brooklyn, city and State of New York, have invented a certain new and useful Improvement in Dispensing Apparatus, of which the following is a specification.

The present invention relates to an apparatus for delivering determinate or measured quantities of fluid bodies, and is especially designed for embodiment in a dispensing device or apparatus for successively discharging by repeated operations definite predetermined quantities of liquid from a reservoir or container.

It is a particular object of the invention to furnish a satisfactory working apparatus of this character simple in construction and effective at each movement of the discharging device to eject from the reservoir a predetermined quantity of the contained liquid.

An apparatus embodying my present improvements is susceptible as one instance of its application to the dispensing or measuring out of predetermined quantities of liquid or liquefied drugs, toilet preparations, and the like and which it is desired to withdraw in small quantities from time to time. Such an embodiment is set forth in the accompanying drawings, in which—

Figure 1 is a front elevation of the apparatus, showing one means of securing the reservoir or containing vessel in position to have its contents discharged a portion at a time.
Fig. 2 is a plan view of the parts illustrated in Fig. 1. Fig. 3 is a longitudinal section through the discharging device attached to the reservoir, the figure being drawn upon a somewhat larger scale than the preceding figures; and Fig. 4 is a similar section through a dispensing apparatus of modified construction.

Similar characters of reference designate corresponding parts in all figures.

The present dispensing apparatus comprises a reservoir or containing vessel of desired and appropriate form and material. For instance, as to its form the vessel may be in the shape of a jar, as indicated in Figs. 1 and 2, in which the reservoir is designated by B, or the containing vessel for holding the liquid may be cylindrical in form and provided with a hemispherical bottom. (See the vessel B' in Fig. 4.) The material from which the vessel is made may also be of various sorts—for instance, glass, metal, &c. Whatever its form and the material from which it is made the vessel will ordinarily be provided with a cover, such as $b$ or $b'$ in the mentioned figures, preferably detachably connected with the vessel in some convenient and appropriate way. An opening or openings to the interior will also be provided to permit the pressure of air to assist in the egress of the liquid through the operation of the discharging device, now to be described, while various means may be employed for holding the vessel in position, holding-straps $b^2$ being in this case indicated as an instance of such means. This discharging device may be said in a general way to comprise a cylinder and piston movable relatively to each other when force is applied by the operator to actuate the device, the normal or retracted position of the one relatively to the other being assured by a returning-spring. The inlet to the cylinder-space from the interior of the vessel is controlled by an inwardly-opening but outwardly-closing valve, (with reference to the former space,) while the discharge from the cylinder (occurring during the forcible contraction of the volume thereof) takes place through an outwardly-opening but inwardly-closing valve.

Referring now in detail to that form of the apparatus disclosed in Figs. 1 to 3, inclusive, there is here comprised a fixed cylinder 2, secured to the containing vessel. In the form of apparatus illustrated the cylinder is secured to the exterior of the vessel, a threaded tubular stem $2^a$ on the cylinder passing through an opening in the side of the vessel, within which latter a clamping-nut $2^b$ engages with the thread on the stem to firmly hold the cylinder in place. Within the cylinder is adapted to slide a piston, such as 3, between which and the bottom of the cylinder is inserted a coiled spring 4, urging the piston to its extreme outward position. In this construction therefore the piston is movable relatively to the cylinder, and for conveniently moving it inwardly against the force of the spring 4 to thereby diminish the space between it and the bottom of the cylinder and discharge the liquid in the cylinder a push-button or knob 5 is provided. The movement of the liquid back into the vessel after the same has flowed outward therefrom to fill the space behind the retreating piston (upon its release and as it is thrust outward by the action of the spring 4) is prevented by an outwardly-closing valve, such as 6, adapted to seat itself against a seat provided for it at the bottom of the cylinder. The seating of this valve is assured by a spring 7, interposed between the valve and the piston, but whose tension is insufficient to prevent the inflow of liquid through the central passage $2^c$ in the stem $2^a$ under the suction of the released and retreating piston. I have also indicated a guide-rod 8 for the valve and valve-seating spring, which extends inwardly from the inner side of the piston and passes loosely through the opening in the stem $2^a$, being in turn loosely fitted by the valve 6. By combining with this rod a nut 9, as shown, the piston is not only prevented from moving out of the cylinder altogether, but by adjusting the nut on the rod provision exists for varying the liquid-space of the cylinder, and hence the quantity that can be discharged from the vessel at each inward movement of the piston.

The discharge-nozzle is designated by 10 and in the particular organization illustrated is shown mounted on the movable piston. This nozzle is of suitable form, and the passage therethrough is controlled by an outwardly-opening valve 11, urged against its seat by a spring 12, exerting a closing pressure on the valve light enough to readily yield upon the forcible inward movement of the piston and permit the outflow of the liquid.

Instead of a construction in which the piston is the movable element of the discharging device I may reverse the relation and adapt the cylinder to move while the piston remains fixed. This is the case in the construction set forth in Fig. 4, in which a fixed piston 3', having a tubular stem $3^a$, is employed. In this form of the apparatus, furthermore, the discharging device is located within the containing vessel, a movable cylinder 2' being fitted to slide over the piston, while an interposed spring 4' serves to elevate the cylinder when released from the pressure of the finger, and thereupon draw in liquid from the containing vessel through a port 3'' in the piston. A valve 6' in this port prevents the return of the liquid in the cylinder to the vessel, gravity in this instance tending to seat the valve, while a bent portion 6'' of the stem 6''' thereof prevents the displacement of the valve. An operating-stem $5^a$, to one end of which the cylinder is attached and which extends upwardly, carrying at its upper end the push-button or knob 5', enables the cylinder to be forced downwardly against the tension of the spring 4', expelling the liquid outwardly through the passage $3^c$ in the piston-stem past an outwardly-opening valve 11', similar to the valve 11 and the seating of which when not under a pressure applied to the liquid in the cylinder is assured by a spring 12'. In the construction illustrated the nozzle (designated by 10') is utilized as a clamping-nut for engaging an annular shoulder $3^d$ on the piston-stem $3^a$ with the inner face of the bottom of the vessel, thereby firmly holding the piston in place.

If the operating-stem $5^a$ is threaded to engage with the push-button or knob 5' and the latter is provided with a shoulder 5'', adapted to engage with the under face of the cover $b'$, by screwing the button up or down the position of the cylinder relatively to the piston may be adjusted, and hence such a construction serves to vary the amount of liquid discharged at each operation of the device.

When employed to discharge from time to time portions of the vessel's contents, an inward thrust of the operating-button serves to force the liquid in the cylinder through the discharge-passage and past the outwardly-opening valve. Upon its release the movable cylinder or piston, as the case may be, being moved back to its normal position by the spring tends to effectually close such valve and by opening the inwardly-opening valve to draw liquid into the cylinder.

The employment of a spring for returning the movable element of the discharging device is of especial advantage, since it automatically, as it were, returns the parts after operation, during which return the cylinder is filled afresh from the containing vessel. Thereafter a single inward thrust by the operator is all that is necessary at any time to obtain a quantity of the preparation from the vessel.

Having described my invention, I claim—

1. In a dispensing apparatus, the combination of a liquid-reservoir, a piston and a cylinder, one of which members is reduced in diameter to form a perforated projection extending through an opening in the reservoir, a clamping-nut engaging with the said reduced projection, and securing the projection-provided member to the reservoir, an operating-rod extending from the other member, a push-button for actuating the operating-rod, an adjustable nut for regulating the throw of the rod, a spring for returning after actuation the member from which the operating-rod extends and valves in the inlet and outlet passages of the reservoir.

2. In a dispensing apparatus, the combination of a liquid-reservoir, straps inclosing the reservoir and serving to fasten it fixedly in position, a piston and a cylinder, one of which members is reduced in diameter to form a perforated projection extending through an opening in the reservoir, a clamping-nut engaging with the said reduced projection, and securing the projection-provided member to the reservoir, an operating-rod extending from the other member, a push-button for actuating the operating-rod, an adjustable nut for regulating the throw of the rod, a spring for returning after actuation the member from which the operating-rod extends, and valves in the inlet and outlet passages of the reservoir.

3. In a dispensing apparatus, the combination of a liquid-reservoir, a piston having a perforated projection extending through an opening in the reservoir, a clamping-nut engaging with said projection and fixedly securing the piston to the reservoir, a cylinder slidably fitted to the piston, an inclosed returning-spring interposed between the end face of the cylinder and the opposed face of the piston, an operating-rod attached to the cylinder, a push-button adjustably connected to the operating-rod and accessible from the exterior of the reservoir, a stop for limiting the movement of the operating-rod under the action of the spring, and valves in the inlet and outlet passages of the cylinder.

4. In a dispensing apparatus, the combination of a liquid-reservoir, straps inclosing the reservoir and serving to fasten it fixedly in position, a piston having a perforated projection extending through an opening in the reservoir, a clamping-nut engaging with said projection and fixedly securing the piston to the reservoir, a cylinder slidably fitted to the piston, an inclosed returning-spring interposed between the end face of the cylinder and the opposed face of the piston, an operating-rod attached to the cylinder, a push-button adjustably connected to the operating-rod and accessible from the exterior of the reservoir, a stop for limiting the movement of the operating-rod under the action of the spring, and valves in the inlet and outlet passages of the cylinder.

5. In a dispensing apparatus, the combination of a liquid-reservoir, straps inclosing the reservoir and serving to fasten it fixedly in position, a piston having a perforated projection extending through an opening in the reservoir, a clamping-nut constituting a delivery-nozzle and engaging with said projection to fixedly secure the piston to the reservoir, a cylinder slidably fitted to the piston, an inclosed returning-spring interposed between the end face of the cylinder and the opposed face of the piston, an operating-rod attached to the cylinder, a push-button adjustably connected to the operating-rod and accessible from the exterior of the reservoir, a stop for limiting the movement of the operating-rod under the action of the spring, and valves in the inlet and outlet passages of the cylinder.

In testimony whereof I have hereunto signed my name in the presence of two subscribing witnesses.

DAYVE BORIS DE WALTOFF.

Witnesses:
HARRY HERTZBERG,
GEORGE HARRIS.